(12) United States Patent
Sato

(10) Patent No.: US 6,914,792 B2
(45) Date of Patent: Jul. 5, 2005

(54) POWER SUPPLY APPARATUS, POWER SUPPLY CONTROL APPARATUS, POWER SUPPLY CONTROL METHOD

(75) Inventor: Takashi Sato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/321,540

(22) Filed: Dec. 18, 2002

(65) Prior Publication Data

US 2003/0146664 A1 Aug. 7, 2003

(30) Foreign Application Priority Data

Feb. 4, 2002 (JP) .................................... 2002-027386

(51) Int. Cl.[7] ............................................. H02M 3/02
(52) U.S. Cl. ........................................ 363/65; 307/82
(58) Field of Search .............................. 363/49, 65, 67, 363/69, 70; 307/43, 58, 60, 69, 82

(56) References Cited

U.S. PATENT DOCUMENTS 5,267,135 A  * 11/1993 Tezuka et al. ................. 363/49

FOREIGN PATENT DOCUMENTS

JP   5-101766    4/1993
JP   11-167436   6/1999

* cited by examiner

Primary Examiner—Gary L. Laxton
(74) Attorney, Agent, or Firm—Westerman, Hattori, Daniels & Adrian, LLP

(57) ABSTRACT

There are provided a plurality of power supply units which supply power to a load. The power supply units are started one after other. Starting status of each of the power supply unit is monitored. When all of the power supply units have been started, power from all the power supply units is simultaneously supplied to a load.

5 Claims, 4 Drawing Sheets

US 6,914,792 B2

POWER SUPPLY APPARATUS, POWER SUPPLY CONTROL APPARATUS, POWER SUPPLY CONTROL METHOD

FIELD OF THE INVENTION

The present invention relates to a technology that stably supplies power from a plurality of power supply units to a load.

BACKGROUND OF THE INVENTION

FIG. 3 shows a configuration of a conventional power supply apparatus. There is shown a power supply apparatus in which three power supply units $20_1$ to $20_3$ simultaneously supply power to a load 30.

There provided a circuit breaker $10_1$ on an input side of the power supply unit $20_1$. This circuit breaker $10_1$ includes a switch $11_1$ which connects/disconnects an input voltage Vac1 to the power supply unit $20_1$. The power supply unit $20_1$ converts the input voltage Vac1 to an output voltage V1 (see FIG. 4), and supplies the output voltage V1 to the load 30.

There provided a circuit breaker $10_2$ on an input side of the power supply unit $20_2$. This circuit breaker $10_2$ includes a switch $11_2$ which connects/disconnects an input voltage Vac2 to the power supply unit $20_2$. The power supply unit $20_2$ converts the input voltage Vac2 to an output voltage V2 (see FIG. 4), and supplies the output voltage V2 to the load 30.

There provided a circuit breaker $10_3$ on an input side of the power supply unit $20_3$. This circuit breaker $10_3$ includes a switch $11_3$ which connects/disconnects an input voltage Vac3 to the power supply unit $20_3$. The power supply unit $20_3$ converts the input voltage Vac3 to an output voltage V3 (see FIG. 4), and supplies the output voltage V3 to the load 30.

A power supply capacity of the load 30 is made equal to a total power supply capacity of the power supply units $20_1$ to $20_3$. Therefore, the power supply apparatus shown in FIG. 3 does not have a redundant configuration.

All of the switches $11_1$ to $11_3$ are in the off-state before the power supply is thrown in. When throwing in power supply, the switches are turned on in the order of the switch $11_1$, the switch $11_2$, and $11_3$. If the switch $11_1$ of the circuit breaker $10_1$ is turned on at time t1 shown in FIG. 4, then the input voltage Vac1 is supplied to the power supply unit $20_1$.

As a result, the output voltage V1 is supplied from the power supply unit $20_1$ to the load 30. However, the power supply capacity of the load 30 cannot be satisfied with the output voltage V1 alone. Therefore, the output voltage V1 gradually droops as shown in FIG. 4.

If the switch $11_2$ of the next circuit breaker $10_2$ is turned on at time t2 shown in FIG. 4, then the input voltage Vac2 is supplied to the power supply unit $20_2$. As a result, the output voltage V2 is also supplied from the power supply unit $20_2$ to the load 30. At the time t2, the output voltage V1 also rises. In this instance, power is supplied from two power supply units $20_1$ and $20_2$ to the load 30.

However, the power supply capacity of the load 30 is not satisfied with the output voltages V1 and V2. As shown in FIG. 4, therefore, each of the output voltages V1 and V2 gradually droops from the time t2.

If the switch $11_3$ of the next circuit breaker $10_3$ is turned on at time t3 shown in FIG. 4, then the input voltage Vac3 is supplied to the power supply unit $20_3$. As a result, the output voltage V3 is also supplied from the power supply unit $20_3$ to the load 30. At the time t3, each of the output voltages V1 and V2 also rises.

In this instance, power is supplied from three power supply units $20_1$, $20_2$ and $20_3$ to the load 30. Therefore, the power supply capacity of the load 30 is satisfied. As shown in FIG. 4, each of the output voltages V1, V2 and V3 becomes stable at a fixed value after the time t3.

As shown in FIG. 4, the conventional power supply apparatus has a problem that the rise and droop of the output voltages are repeated and the power supply to the load 30 becomes unstable until power of a power supply capacity required for the load 30 is supplied (i.e., between the time t1 and the time t3).

Lately when the power consumption of integrated circuits that form a part of the load 30 tends to increase, the number of the power supply units also increases to satisfy the required power supply capacity. As the number of power supply units increases, the time during which the power supply becomes unstable is prolonged. In the conventional power supply apparatus, therefore, the problem becomes remarkable.

SUMMARY OF THE INVENTION

It is an object of this invention to provide a power supply apparatus, a power supply control apparatus, and power supply control method capable of stabilizing power supply to a load.

According to the present invention, a plurality of power supply units which supply power to a load are started one after other. Starting status of each of the power supply unit is monitored. When all of the power supply units have been started, power from all the power supply units is simultaneously supplied to a load.

Other objects and features of this invention will become apparent from the following description with reference to the accompanying drawings.

DETAILED DESCRIPTIONS

Embodiments of the power supply apparatus, the power supply control apparatus, and the power supply control method according to the present invention will be explained with reference to the accompanying drawings.

Figure 1:
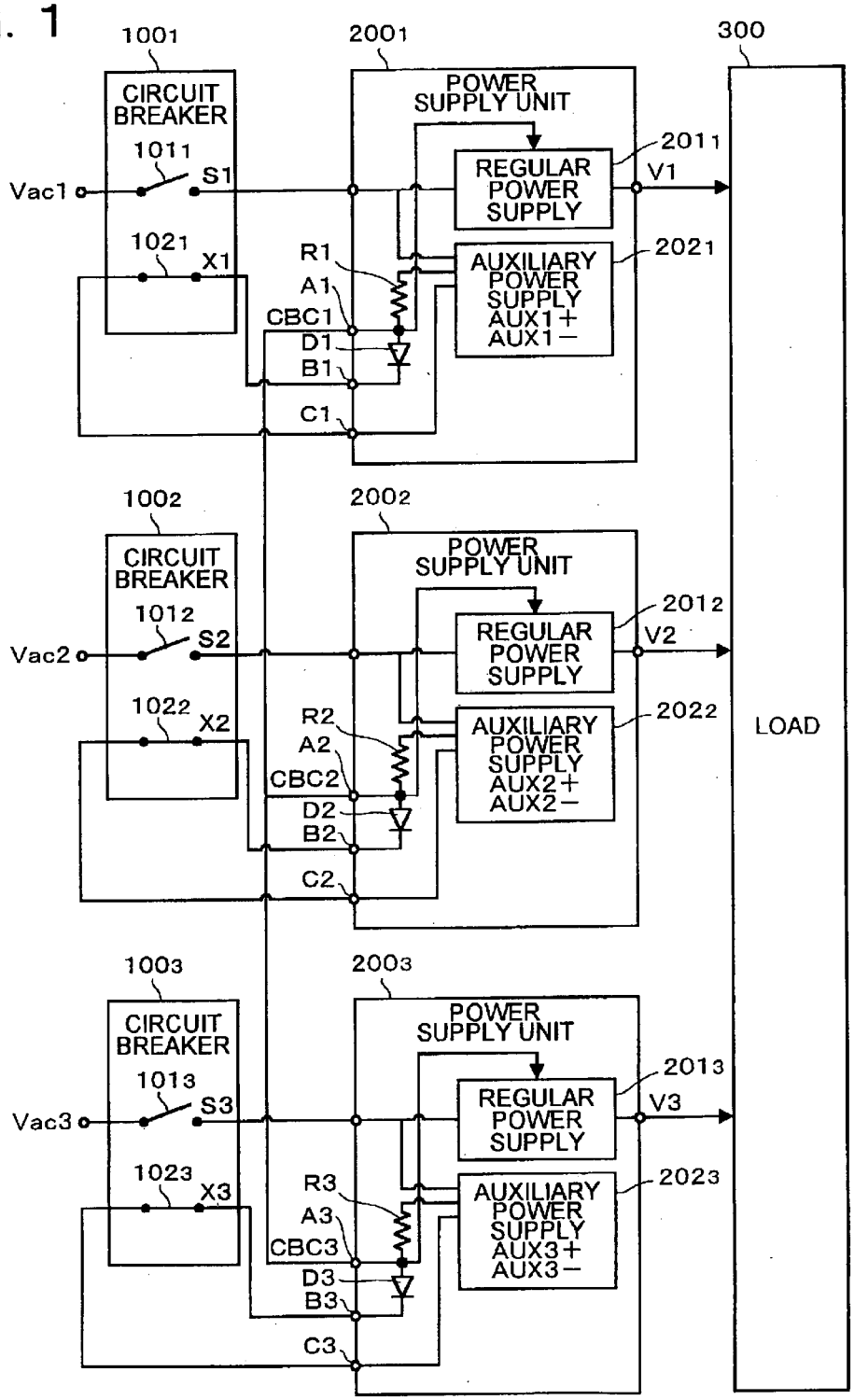
FIG. 1 is a block diagram that shows a configuration of an embodiment according to the present invention.

FIG. 1 shows a configuration of an embodiment according to the present invention. There is shown a power supply apparatus in which three power supply units $200_1$ to $200_3$ simultaneously supply power to a load 300.

There is provided a circuit breaker $100_1$ on an input side of the power supply unit $200_1$. This circuit breaker $100_1$ includes a main switch $101_1$ which connects/disconnects an input voltage Vac1 to the power supply unit $200_1$. The circuit breaker $100_1$ has an auxiliary switch $102_1$ which is turned off/on with a logic opposite to that of the main switch $101_1$.

Figure 2:
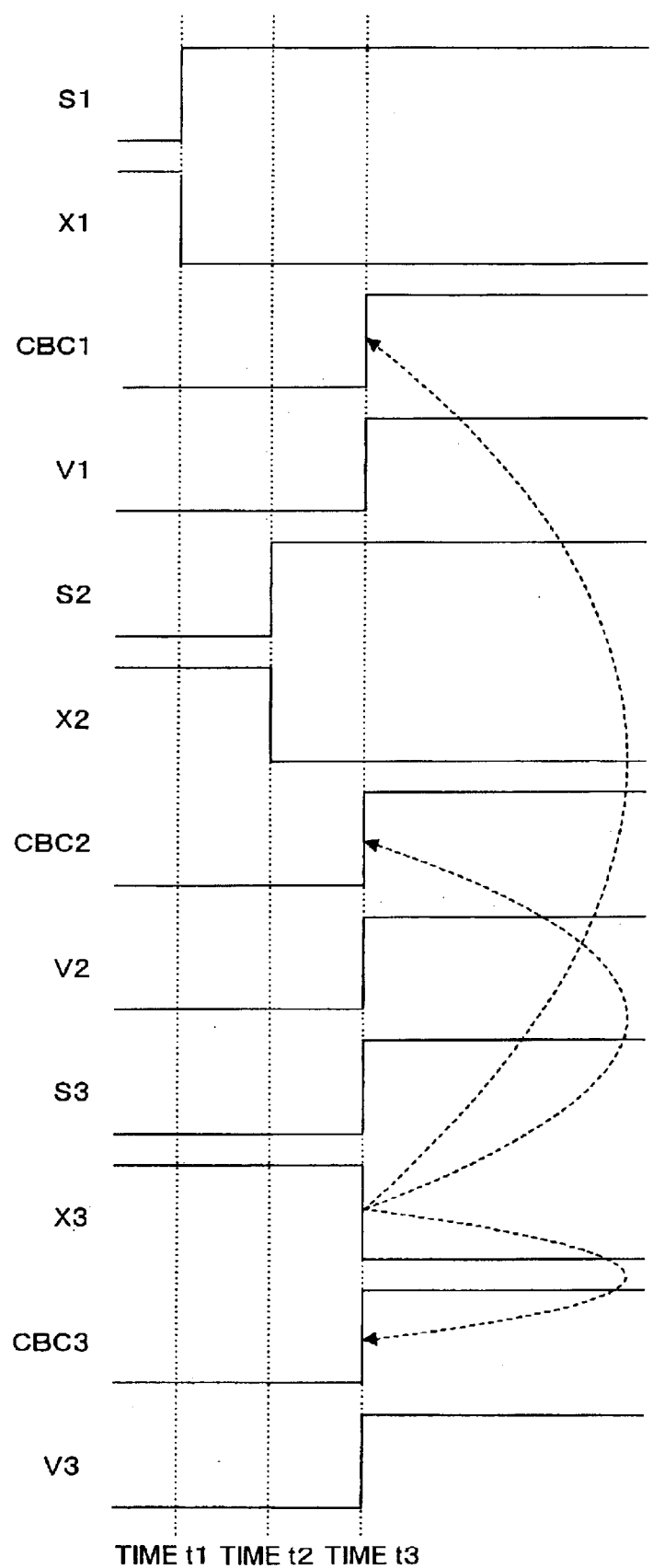
FIG. 2 is a diagram that explains an operation of the embodiment shown in FIG. 1.
Figure 3:
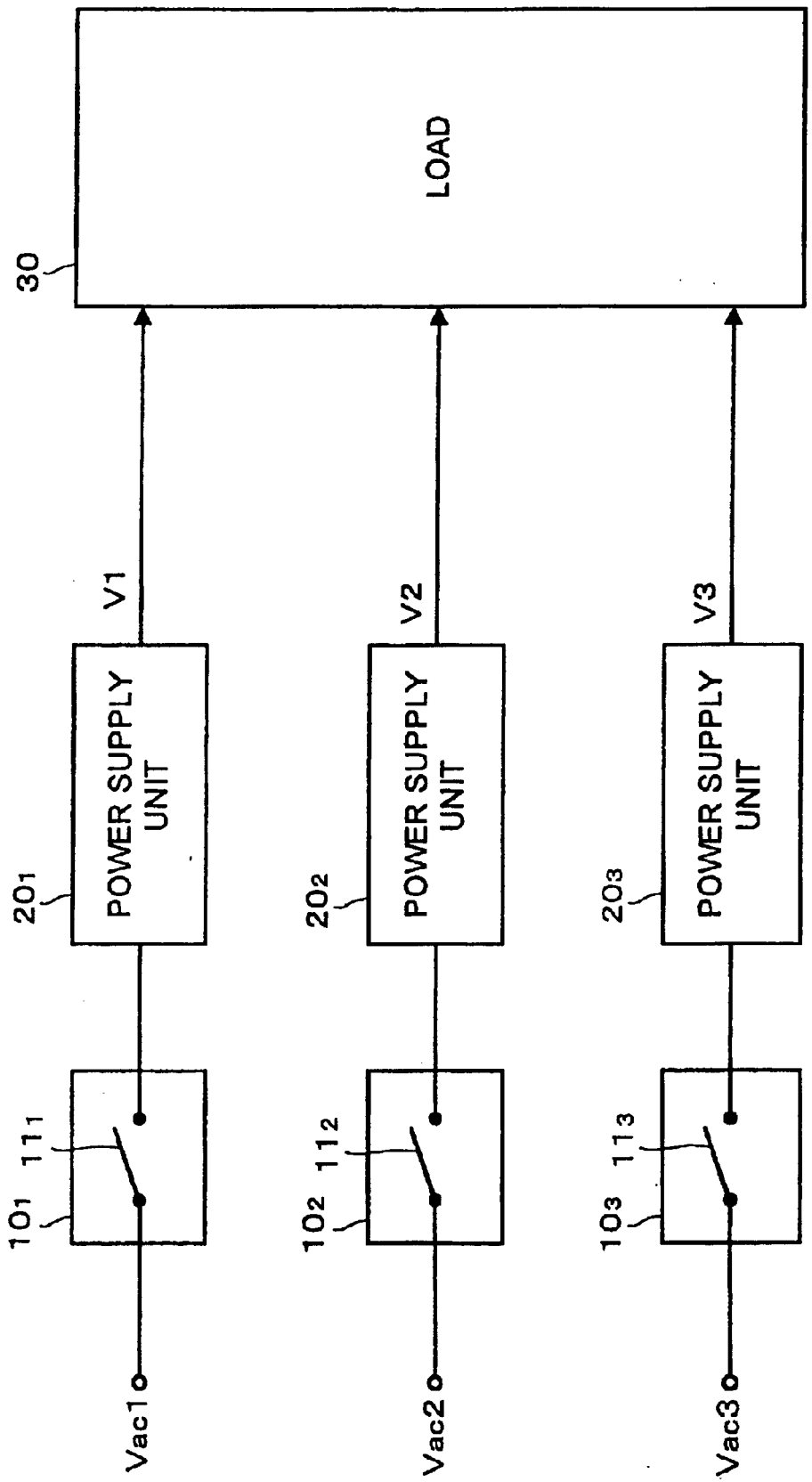
FIG. 3 is a block diagram that shows a configuration of a conventional power supply apparatus.
Figure 4:
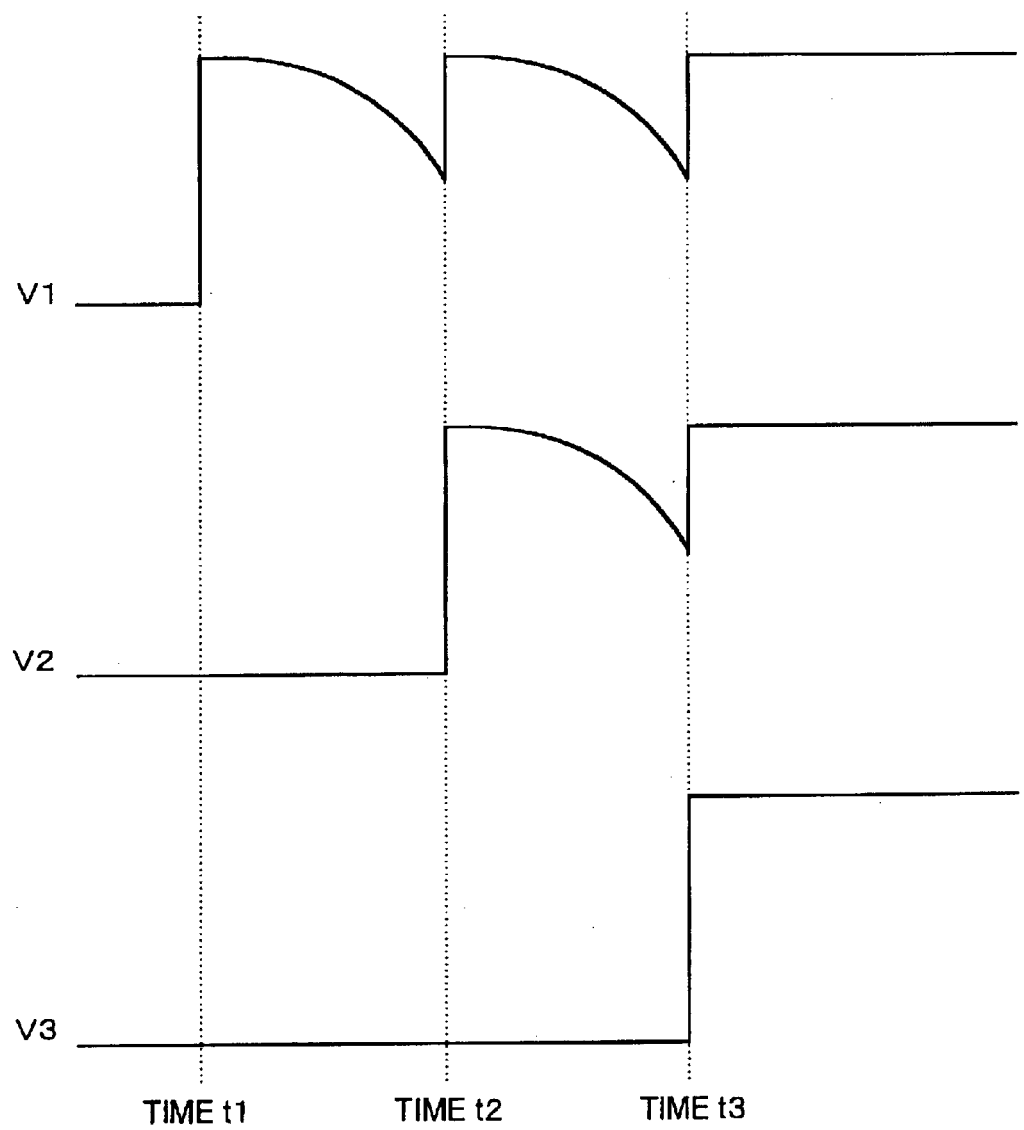
FIG. 4 is a diagram that explains an operation of the conventional power supply apparatus shown in FIG. 3.

A main switch signal S1 indicates whether the main switch $101_1$ is on or off. For example, as shown in FIG. 2, the main switch signal S1 has a high logical level when the main switch $101_1$ is on, and a low logical level when the main switch $101_1$ is off.

An auxiliary switch signal X1 indicates whether the auxiliary switch $102_1$ is on or off. For example, as shown in FIG. 2, the auxiliary switch signal X1 has a high logical level when the auxiliary switch $102_1$ is on (i.e. when the main switch $101_1$ is off), and has a low logical level when the auxiliary switch $102_1$ is off (i.e. when the main switch $101_1$ is on).

The power supply unit $200_1$ converts the input voltage Vac1 to an output voltage V1 (see FIG. 2), and supplies the output voltage V1 to the load 300. This power supply unit $200_1$ includes a regular power supply $200_1$. The regular power supply $201_1$ has three functions. First, to convert the input voltage Vac1 to the output voltage V1. Second, to stop the supply of the output voltage V1 to the load 300 while a potential CBC1 (see FIG. 2) explained later has a low logical level. Third, to supply the output voltage V1 to the load 300 while the potential CBC1 has a high logical level.

The power supply unit $200_1$ also includes an auxiliary power supply $202_1$. This auxiliary power supply $202_1$ converts the input voltage supplied via the main switch $101_1$ of the circuit breaker $100_1$ to a plus voltage AUX1+ and a minus voltage AUX1−. The plus voltage AUX1+ is applied to a terminal A1 via a resistor R1. On the other hand, a minus voltage AUX1− is applied to a terminal C1. The auxiliary switch $102_1$ has been provided between a terminal B1 and the terminal C1 of the power supply unit $200_1$. A diode D1 is provided between the terminal A1 and the terminal B1.

There is provided circuit breaker $100_2$ on an input side of the power supply unit $200_2$. This circuit breaker $100_2$ includes a main switch $101_2$ which connects/disconnects an input voltage Vac2 to the power supply unit $200_2$. The circuit breaker $100_2$ has an auxiliary switch $102_2$ which is turned off/on with a logic opposite to that of the main switch $101_2$.

A main switch signal S2 indicates whether the main switch $101_2$ is on or off. For example, as shown in FIG. 2, the main switch signal S2 has a high logical level when the main switch $101_2$ is on, and a low logical level when the main switch $101_2$ is off.

An auxiliary switch signal X2 indicates whether the auxiliary switch $102_2$ is on or off. For example, as shown in FIG. 2, the auxiliary switch signal X2 has a high logical level when the auxiliary switch $102_2$ is on (i.e. when the main switch $101_2$ is off), and has a low logical level when the auxiliary switch $102_2$ is off (i.e. when the main switch $101_2$ is on).

The power supply unit $200_2$ converts the input voltage Vac2 to an output voltage V2 (see FIG. 2), and supplies the output voltage V2 to the load 300. This power supply unit $200_2$ includes a regular power supply $201_2$. The regular power supply $201_2$ has three functions. First, to convert the input voltage Vac2 to the output voltage V2. Second, to stop the supply of the output voltage V2 to the load 300 while a potential CBC2 (see FIG. 2) explained later has a low logical level. Third, to supply the output voltage V2 to the load 300 while the potential CBC2 has a high logical level.

The power supply unit $200_2$ also includes an auxiliary power supply $202_2$. This auxiliary power supply $202_2$ converts the input voltage Vac2 supplied via the main switch $101_2$ of the circuit breaker $100_2$ to a plus voltage AUX2+ and a minus voltage AUX2−. The plus voltage AUX2+ is applied to a terminal A2 via a resistor R2. On the other hand, a minus voltage AUX2− is applied to a terminal C2. The auxiliary switch $102_2$ is has been provided between a terminal B2 and the terminal C2 of the power supply unit $200_1$. A diode D2 is provided between the terminal A2 and the terminal B2.

There is provided circuit breaker $100_3$ on an input side of the power supply unit $200_3$. This circuit breaker $100_3$ includes a main switch $101_3$ which connects/disconnects an input voltage Vac3 to the power supply unit $200_3$. The circuit breaker $100_3$ has an auxiliary switch $102_3$ which is turned off/on with a logic opposite to that of the main switch $101_3$.

A main switch signal S3 indicates whether the main switch $101_3$ is on or off. For example, as shown in FIG. 2, the main switch signal S3 has a high logical level when the main switch $101_3$ is on, and has a low logical level when the main switch $101_3$ is off.

An auxiliary switch signal X3 indicates whether the auxiliary switch $102_3$ is on or off. For example, as shown in FIG. 2, the auxiliary switch signal X3 has a high logical level when the auxiliary switch $102_3$ is on (i.e. when the main switch $101_3$ is off), and has a low logical level when the auxiliary switch $102_3$ is off (i.e. when the main switch $101_3$ is on).

If the auxiliary switch signal X3 falls from the high logical level to the low logical level (at time t3), then the potential CBC1, the potential CBC2, and a potential CBC3 simultaneously rises from the low logical level to the high logical level in response to the falling, which serves as a trigger, and the output voltage V1, the output voltage V2, and an output voltage V3 explained later are simultaneously supplied to the load 300.

The power supply unit $200_3$ converts the input voltage Vac3 to an output voltage V3 (see FIG. 2), and supplies the output voltage V3 to the load 300. This power supply unit $200_3$ includes a regular power supply $201_3$. The regular power supply $201_3$ has three functions. First, to conver the input voltage Vac3 to the output voltage V3. Second, to stop the supply of the output voltage V3 to the load 300 while a potential CBC3 (see FIG. 2) explained later has a low logical level. Third, to supply the output voltage V3 to the load 300 while the potential CBC3 has a high logical level.

The power supply unit $200_3$ also includes an auxiliary power supply $202_3$. This auxiliary power supply $202_3$ converts the input voltage Vac3 supplied via the main switch $101_3$ of the circuit breaker $100_3$ to a plus voltage AUX3+ and a minus voltage AUX3−. The plus voltage AUX3+ is applied to a terminal A3 via a resistor R3. On the other hand, a minus voltage AUX3− is applied to a terminal C3. The auxiliary switch $102_3$ has been provided between a terminal B3 and the terminal C3. A diode D3 is provided between the terminal A3 and the terminal B3. The terminals A1, A2, and A3 have been electrically connected so that they are at the same electrical potential.

A power supply capacity of the load 300 is made equal to a total power supply capacity of the power supply units $200_1$ to $200_3$. Therefore, the power supply apparatus shown in FIG. 1 does not have a redundant configuration.

All of main the switches $101_1$ to $101_3$ are in the off-state before the power supply is thrown in. On the other hand, all of the auxiliary switches $102_1$ to $102_3$ are in the on-state before the power supply is thrown in. Before time t1 shown in FIG. 2, therefore, each of the main switch signals S1, S2 and S3 is at a low logical level, and each of the auxiliary switch signals X1, X2 and X3 is at a high logical level.

If all of the auxiliary switches $102_1$ to $102_3$ are on, then a current flows through each of the diodes D1 to D3, a forward diode voltage drop occurs, and the potentials CBC1 to CBC3 are made low logical levels.

When throwing in power supply, the switches are turned on in the order of the switch $101_1$, the switch $101_2$, and $101_3$. If the main switch $101_1$ of the circuit breaker $100_1$ is turned on from the off-state at time t1 shown in FIG. 2, then the auxiliary switch $102_1$ is turned off from the on-state. As a result, the main switch signal S1 is changed from the low logical level to the high logical level, and the auxiliary switch signal X1 is changed from the high logical level to the low logical level.

Accordingly, the input voltage Vac1 is supplied to the regular power supply $201_1$ and the auxiliary power supply $202_1$ via the main switch $101_1$. When the auxiliary switch $102_1$ has turned off, the current is prevented from flowing through the diode D1 and the forward voltage drop across the diode D1 becomes 0.

Since a current flows through each of other diodes D2 and D3 and the terminals A1 to A3 are connected so as to have the same potential, however, the potential CBC1 remains to be the same level as that of other potentials CBC2 and CBC3. At the time t1, therefore, the output voltage V1 is not supplied from the regular power supply $201_1$ to the load 300.

If the main switch $101_2$ of the circuit breaker $100_2$ is changed from its off-state to its on-state at time t2, then the auxiliary switch $102_2$ is changed from its on-state to its off-state. As a result, the main switch signal S2 is changed from the low logical level to the high logical level, and the auxiliary switch signal X2 is changed from the high logical level to the low logical level.

Accordingly, the input voltage Vac2 is supplied to the regular power supply $201_2$ and the auxiliary power supply $202_2$ via the main switch $101_2$. When the auxiliary switch $102_2$ has turned off, the current is prevented from flowing through the diode D2 and the forward voltage drop across the diode D2 becomes 0.

Since a current flows through the remaining diode D3 and the terminals A1 to A3 are connected so as to have the same potential, however, the potential CBC2 (and the potential CBC1) remains to be the same level as that of the potential CBC3. At the time t2, therefore, the output voltage V2 (and the output voltage V1) is not supplied from the regular power supply $201_2$ (and the regular power supply $201_1$) to the load 300.

If the main switch $101_3$ of the circuit breaker $100_3$ is changed from its off-state to its on-state at time t3, then the auxiliary switch $102_3$ is changed from its on-state to its off-state. As a result, the main switch signal S3 is changed from the low logical level to the high logical level, and the auxiliary switch signal X3 is changed from the high logical level to the low logical level.

Accordingly, the input voltage Vac3 is supplied to the regular power supply $201_3$ and the auxiliary power supply $202_3$ via the main switch $101_3$. When the auxiliary switch $102_3$ has turned off, the current is prevented from flowing through the diode D3 and the forward voltage drop across the diode D3 becomes 0.

At this time, the potential CBC3 is changed from the low logical level to the high logical level by the plus voltage AUX3+ of the auxiliary power supply $202_3$ via the resistor R3. In addition, other potentials CBC1 and CBC2 are also changed from the low logical level to the high logical level.

In other words, in the embodiment, the potentials CBC1 to CBC3 are simultaneously changed from the low logical level to the high logical level in response to a change of the auxiliary switch signal X3 from the low logical level to the high logical level (i.e., a change to a state in which all of the main switches $101_1$ to $101_3$ are on and all of the auxiliary switches $102_1$ to $102_3$ are off) at the time t3, which serves as a trigger. As a result, the output voltages V1 to V3 are simultaneously supplied from the regular power supplies $201_1$ to $201_3$ to the load 300.

As described above, according to the embodiment, when it is determined based on a result (i.e., potentials CBC1 to CBC3 shown in FIG. 2) of the monitoring concerning the start states of a plurality of power supply units $200_1$ to $200_3$ started one after another that all of the plurality of power supply units $200_1$ to $200_3$ have been started, the regular power supplies $201_1$ to $201_3$ are made to supply power to the load 300 simultaneously, as heretofore explained. Therefore, power of a load capacity needed at the same time is supplied to the load 300. Thus, supply of power can be stabilized.

An embodiment according to the present invention has been explained in detail with reference to the drawings. However, concrete configuration examples are not limited to this embodiment, but design changes in a scope that would not depart from the spirit of the present invention would be also incorporated in the present invention.

For example, the diodes D1 to D3 may be replaced with a three-input AND circuit device formed as an integrated circuit. In this instance, the potentials CBC1 to CBC3 are input to the AND circuit device as input signals. When an AND condition is satisfied, power is supplied simultaneously from the power supply units $201_1$ to $201_3$ to the load 300.

As described above, according to one aspect of this invention, when it is determined based on a result of the monitoring concerning the start states of a plurality of power supply units started one after another that all of the plurality of power supply units have been started, the plurality of power supplies are made to supply power to the load simultaneously, as heretofore explained. Therefore, power of a load capacity needed at the same time is supplied to the load. This results in an effect for supplying of power can be stabilized.

According to another aspect of this invention, the stating states are monitored on the basis of the input voltages of a plurality of power supply units. Therefore, power of a load capacity needed at the same time is supplied to the load. This results in an effect for supplying of power can be stabilized.

According to still another aspect of this invention, an AND-ing function of signals is performed on the basis of a plurality of input voltages, and a plurality of power supply units are made to simultaneously supply power to the load, when it is determined that an AND condition of the AND-ing function has been satisfied. Therefore, power of a load capacity needed at the same time is supplied to the load. This results in an effect for supplying of power can be stabilized.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A power supply apparatus comprising:
   a plurality of power supply units having a regular power supply to supply power to a load and an auxiliary power supply to convert a voltage input to the regular power supply into another voltage;
   a monitoring unit which monitors, when each of the power supply units is started one after the other, starting states of the power supply units by using the voltage converted by the auxiliary power supply; and a control unit which causes the plurality of power supply units to simultaneously supply power to the load by using the voltage converted by the auxiliary power supply, when the monitoring unit determines that all of the power supply units have been started.

2. The power supply apparatus according to claim 1, wherein the monitoring unit monitors the starting state of the power supply unit based on a voltage input to that power supply unit.

3. The power supply apparatus according to claim 1, wherein the monitoring unit performs an AND operation of signals based on a plurality of input voltages, and the control unit causes the plurality of power supply units to simultaneously supply power to the load, when the monitoring unit determines that an AND condition is satisfied.

4. A power supply control apparatus comprising:

a monitoring unit which monitors, when each of a plurality of power supply units are started one after the other, starting states of the power supply units by using a voltage converted by a respective auxiliary power supply;

a control unit which causes the plurality of power supply units to simultaneously supply power to a load by using the voltage converted by the respective auxiliary power supply, when the monitoring unit determines that all of the power supply units have been started.

5. A power supply control method comprising:

starting each of a plurality of power supply units one after the other;

converting a voltage input to each of the power supply units into another voltage;

monitoring starting states of the power supply units by using the voltage converted; and causing all of the power supply units to simultaneously supply power to a load by using the voltage converted, when it is determined that all of the power supply units have been started.

* * * * *